United States Patent
Diego (10) Patent No.: US 9,561,551 B2
(45) Date of Patent: Feb. 7, 2017

(54) TOOL, TOOLHOLDER AND TOOL-TOOLHOLDER UNIT FOR MILLING CUTTERS AND/OR SHREDDERS

(71) Applicant: Fae Group S.p.A., Fondo—TN (IT)

(72) Inventor: Scanzoni Diego, Fondo (IT)

(73) Assignee: FAE GROUP S.P.A., Fondo—TN (IT)

( * ) Notice: Subject to any disclaimer, the term of this patent is extended or adjusted under 35 U.S.C. 154(b) by 338 days.

(21) Appl. No.: 14/482,569

(22) Filed: Sep. 10, 2014

(65) Prior Publication Data

US 2015/0078843 A1  Mar. 19, 2015

(30) Foreign Application Priority Data

Sep. 17, 2013  (IT) ............... VR2013A0215

(51) Int. Cl.
*B23C 5/22* (2006.01)
*B02C 18/18* (2006.01)

(52) U.S. Cl.
CPC ............... *B23C 5/22* (2013.01); *B02C 18/18* (2013.01); *B23C 2200/361* (2013.01); *B23C 2210/165* (2013.01); *Y10T 407/2274* (2015.01); *Y10T 407/24* (2015.01)

(58) Field of Classification Search
CPC ...... B02C 18/18; B23C 5/22; B23C 2200/361; B23C 2210/165; Y10T 407/2274; Y10T 407/24
USPC ......................................................... 144/228
See application file for complete search history.

(56) References Cited

U.S. PATENT DOCUMENTS

2005/0098331 A1\* 5/2005 Edwards ............. A01B 33/103
172/701.3

FOREIGN PATENT DOCUMENTS

| CA | 2290148 A1 \* | 12/2000 | ........... A01G 23/067 |
| DE | 19623730 A1 \* | 12/1997 | ............ B02C 18/18 |
| FR | 2967009 A1 \* | 5/2012 | ........... A01B 33/103 |

\* cited by examiner

*Primary Examiner* — Sunil K Singh
*Assistant Examiner* — Alan Snyder
(74) *Attorney, Agent, or Firm* — Notaro, Michalos & Zaccaria P.C.

(57) ABSTRACT

A tool, a toolholder and a tool-toolholder unit obtained by coupling tool and toolholder is adapted to be fixed to a rotor of a shredder. The tool and the toolholder have a coupling mechanism that permit a quick and easy assembly or disassembly of the two elements and ensure, at the same time, a stable and safe fixing during use of the tool.

9 Claims, 6 Drawing Sheets

TOOL, TOOLHOLDER AND TOOL-TOOLHOLDER UNIT FOR MILLING CUTTERS AND/OR SHREDDERS

The present invention refers, in general, to a tool, a toolholder and a tool-toolholder unit. More particularly, the present invention concerns a tool, a toolholder and a tool-toolholder unit realized by joining such tool to such toolholder through coupling means in order to obtain a stable and durable releasable fixing of the two elements to be applied on milling cutters or shredders.

As is known, the shredders, the milling cutters or other crushing and mincing machines may comprise one or more rotors to which toolholders are fixed stably; in turn, a corresponding tool is coupled to each toolholder and comprises one or more cutting elements.

The coupling system for the joining of the tool to the toolholder has to allow a stable and rigid fixing since the tool has to support high workloads and considerable opposing forces.

At the same time, however, the tool has to be removable from the toolholder in order to replace such tool with a new tool or to perform the maintenance operations, for instance when it is necessary to substitute the cutting elements worn.

Consequently, the coupling system for the joining of a tool to a toolholder has on the one side to allow a stable union so as to ensure an optimal action of the tool on the material to be shredded; on the other side, such coupling system has to allow a practical removal and a quick fixing of tool and toolholder so as not to complicate or slow the operations of regular maintenance.

According to the prior art, a tool may be coupled to the corresponding toolholder by means of a screw that is screwed into a first hole formed in the tool and into a second hole formed in the toolholder, the two holes being coaxial to each other. According to this configuration, the tool maintenance and replacement operations are rather simple and quick since it is sufficient to unscrew an only screw in order to remove the tool from the toolholder. At the same time, however, a coupling of this kind is not rigid and stable because the tool in action tends to slightly displace from the ideal position since the tool rotates about an axis coaxial to that of the fixing screw with a consequent worsening of the performance of the working tool. In order to avoid such displacement, it is necessary to mount the tool under tension on the toolholder through an interaction of inclined planes abutting to each other, such inclined planes being formed on the tool and on the toolholder.

Moreover, the screw itself is subject to wear because the screw goes in direct contact with the material to be milled or with the milled material. To this end, the screw is screwed directly into a threaded blind hole formed in the tool so as to avoid the presence of a bolt in exposed areas of the unit; besides, the screw head may be received and protected in a suitable hole formed in the toolholder.

Figure 1:
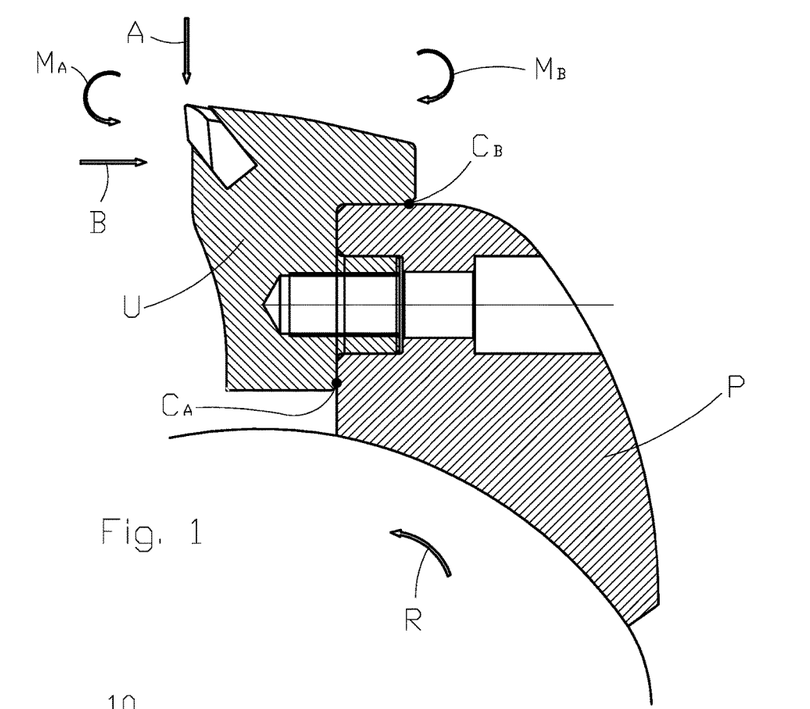
FIG. 1 is a front view of a tool-toolholder unit according to prior art, as described previously.

FIG. 1 illustrates schematically a tool-toolholder unit which rotates according to the direction R. A recess at right angle is formed in the tool U of the tool-toolholder unit. The upper portion of the toolholder P is shaped in a similar way and abuts on the recess at right angle.

The fixing of the tool U to the toolholder P is obtained by means of a screw, not illustrated in the figures, which is screwed into a threaded blind hole formed in the tool U, and passes through a second through hole formed in the toolholder P.

This configuration involves the formation of tensions in the fixing screw that is thus more stressed and subject to breakages.

In fact, in addition to the displacement owing to rotation, the tool is subject to forces due to impacts against obstacles in the ground that tend to provoke the removal of the tool itself from the toolholder.

Such forces may be schematically summarized in a vertical force and a horizontal force, schematically denoted in FIG. 1 by arrows A and B, respectively. Basically, these forces act on the top of the cutting element disposed on the tool.

With reference to the point of support $C_A$ whose positioning is illustrated schematically in FIG. 1, the force A generates a moment $M_A$ which in turn, generates a tractive effort on the coupling screw coupling the tool to the toolholder.

With reference to the point of support $C_B$ whose positioning is schematically illustrated in FIG. 1, the force B generates a moment $M_B$ which in turn, generates also a tractive effort on the screw.

Thus, the screw must guarantee a tightness that must be opposite and greater than such tractive efforts.

Furthermore, there is another problem in the tool-toolholder units of the prior art: in fact, the formation of a through hole or a blind hole in the toolholder and the tool, respectively, involves a surface discontinuity that could give rise to the formation of breaking cracks.

An aim of the present invention is thus to remove the above-mentioned drawbacks and others through the realization of a tool, a toolholder and a relative tool-toolholder unit consisting of the same tool and toolholder, for milling cutters, shredders or other crushing machines that must be provided with an optimal coupling system for the coupling of the tool to the toolholder.

Another aim of the present invention is to carry out a coupling system that ensures a stable and rigid fixing of the tool to the toolholder and allows, at the same time, in case of need, a removal and a union of the two elements in a simple and quick way.

Another aim of the present invention is to minimize the efforts on the connection screw that connects tool and toolholder.

Another aim of the present invention is to carry out a coupling system that excludes any unwanted displacement of the tool relative to the toolholder when the same tool is in action.

Another aim of the invention is to obtain a tool-toolholder coupling that does not put in tension the two elements and minimizes surface discontinuities in order to avoid possible breakages.

The above-mentioned aims and others are achieved according to the invention by a tool-toolholder unit adapted to be fixed to a rotor of a shredding machine and comprising a tool and a toolholder; said tool comprises a lower face and a rear face from which a cylindrical body protrudes, a coupling hole being formed in said cylindrical body; the toolholder comprises a body from which a protruding element protrudes so as to form a front recess with a lower face and a front face, a through hole being formed in said toolholder; the coupling of the tool with the toolholder is obtained by laying the lower face and the rear face of the tool on the lower face and on the front face of the toolholder, respectively, by inserting the cylindrical body in the through hole so as to arrange the coupling hole and the through hole coaxially to each other, and inserting a screw in the through hole of the toolholder and in the coupling hole of the tool.

Through this configuration, the downward thrust on the tool, indicated previously by the arrow A, is counteracted by the protruding element, in particular by the lower face of the front recess while the opposite thrust, opposite to the direction of rotation of the tool, indicated by the arrow B, is counteracted by the front face of the recess formed in the toolholder.

Besides, the coupling of the cylindrical body of the tool with the through hole avoids lateral displacements, namely longitudinal displacements with respect to the rotor.

Advantageously, in the tool-toolholder unit according to the invention, the lower face of the toolholder may be placed on a plane tangent to the inner surface of the through hole of the toolholder and the lower face of the tool may be placed on a plane tangent to the outer surface of the cylindrical body of the tool.

In other words, the through hole in the toolholder is formed in the lowest point of the toolholder and likewise, the cylindrical body of the tool is disposed in the lowest point of the tool.

Through this arrangement of the cylindrical body in the tool and the corresponding through hole formed in the toolholder, the screw is placed at the lowest point possible: this position ensures the maximum contrast to the forces produced by the working in the front direction, namely to the force B indicated in FIG. 1, while maintaining a good efficiency in contrasting the radial and rotational stresses.

In other words, the holding force of the screw creates a moment with respect to the point $C_B$—as disposed in FIG. 1—which counteracts the moment $M_B$. By placing the screw at the lowest end, the arm of said holding force has the maximum possible length. In this way, the entity of the same contrast moment is increased and a better tightness of the screw and the tool-toolholder coupling is guaranteed.

Furthermore, if the screw is placed in the lowest possible position with respect to the tool and toolholder, the screw has to be longer than the screws that are usually used in the units according to prior art. This additional length is to the benefit of the elasticity of the screw itself so that the screw is less subject to breakages. Besides, since the screw is placed in a lower position, the screw is moved away from the area of greatest wear that is the space closest to the cutting element of the tool.

Advantageously, the tool may comprise a main body from which a protruding body with a lower abutting face protrudes in the upper part, said abutting face being supported by an upper face of the toolholder when the tool and the toolholder are assembled.

In other words, the abutting face of the protruding body in the upper part of the tool abuts on the upper face of the toolholder so as to guarantee an optimal coupling of tool and toolholder and avoid any rotation of the tool about the axis of the screw.

Besides, according to the invention, the coupling hole formed in the tool may be threaded so that by coupling the tool to the toolholder the screw passes through the through hole and is screwed into the coupling hole.

In this way, it is not necessary the presence of any bolt since only the screw head is arranged externally to the toolholder.

Advantageously, the through hole may be formed by a first hole, a second hole and a third hole, the first hole being open towards the front recess and having a diameter equal to the diameter of the cylindrical body, the second hole being continuous and coaxial to the first hole, the third hole being continuous to the second hole, open towards the opposite part of the front recess and having a diameter longer than the diameter of the second hole; the screw comprises a head and a threaded stem which passes through the through hole and is screwed into the coupling hole. In particular, the head may be received in the third hole and abuts on a circular crown defined by the variation of diameter between the second hole and the third hole so as to be received in the inside of the toolholder and protected while remaining accessible.

Differently, a tool-toolholder unit according to the invention may provide that in the body part opposite to the front recess, a rear recess is formed, that the through hole is formed by a first hole and a second hole, the first hole being open towards the front recess and having a diameter equal to the diameter of the cylindrical body, the second hole being continuous and coaxial to the first hole and open towards the rear recess. The screw may comprise a head and a threaded stem which passes through the through hole and is screwed into the coupling hole of the tool so that the head abuts on the face of the rear recess and is arranged in the rear recess in order to be easily accessible.

Differently, a front recess may be formed in the tool on the front part and the screw may comprise a threaded stem and a head having a section corresponding to the front recess; the coupling hole passing through the main body is formed in the tool, is open on one side in the cylindrical body and is open on the other side towards the front recess; the stem may pass through the coupling hole and the through hole up to go out of the rear recess where a washer is inserted and a bolt is screwed.

In this way, the head is arranged in the front recess so as to protect, at least partially, the front face of the tool.

Moreover, through such configuration there is not the risk that the screw breaks and its tip remains screwed into the tool so that the tool is no more usable.

Advantageously, the head of the screw may extend along the whole front portion of the tool when the screw is fixed with the bolt to the tool and the toolholder so as to cover all the front face of the tool and protect same. In this way, since the tool-toolholder unit is subject to wear, it will be sufficient to replace only the screw according to predetermined time intervals, and not the tool with a significant cost reduction.

The aims are also achieved according to the invention through a toolholder adapted to be fixed to a rotor of a shredding machine and to which a tool is coupled; in the toolholder, a main body is comprised, from which a protruding element extends so as to form a front recess with a lower face and a front face.

In particular, a through hole is formed in the toolholder and is opened towards a front recess and is formed by a first hole facing the front recess, and a second hole. In addition, the toolholder is characterized by the fact that the lower face of the toolholder is placed on a plane tangent to the inner surface of the through hole of the toolholder so as to obtain the advantages described previously as concerns the tool-toolholder unit.

The aims are also achieved according to the invention through a tool to be coupled to a toolholder and comprising a lower face and a rear face from which a cylindrical body protrudes in which a coupling hole is formed. The tool is characterized by the fact that the lower face is disposed on a plane tangent to the outer surface of the cylindrical body of the tool so as to obtain the advantages described previously as concerns the tool-toolholder unit.

Further features and details of the invention will be better understood from the following specification supplied as a non-restricting example, as well as from the accompanying drawings, wherein.

With reference to the accompanying figures, in particular to FIGS. 12 to 18, reference numbers 70, 80, 90 denote tool-toolholder units adapted to be fixed to a rotor of a milling cutter, a shredder or other crushing/mincing machine, each comprising a respective tool 10, 20 and a respective toolholder 30, 50 that may be coupled to each other by means of a screw 71, 81, or by means of a connecting unit formed by a screw 91, a washer 96 and a bolt 98, as described later.

The tools 10, 20, respectively a first tool 10 and a second tool 20, and the toolholder 30, 50, respectively a first toolholder 30 and a second toolholder 30, are described below. At first, such elements are described individually, and after the assembling, such elements are described according to three different combinations from which three tool-toolholder units 70, 80, 90 are obtained.

It is to be intended that the tool, and in particular the cutting element, as well as the toolholder may have a different shape from those illustrated and described, while maintaining the coupling features according to the invention.

Figure 2:
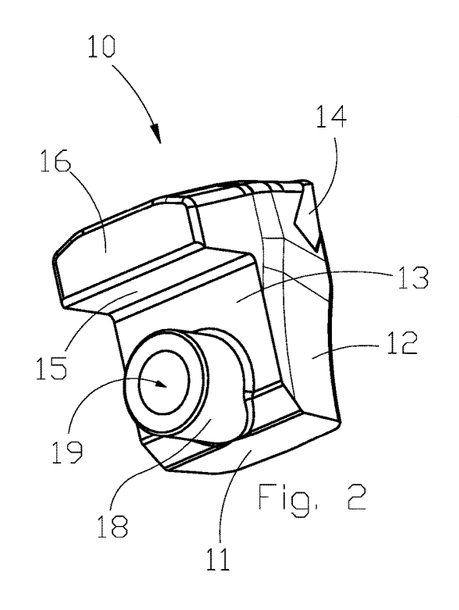
FIG. 2 is a schematic perspective rear view of a tool according to the invention.
Figure 3:
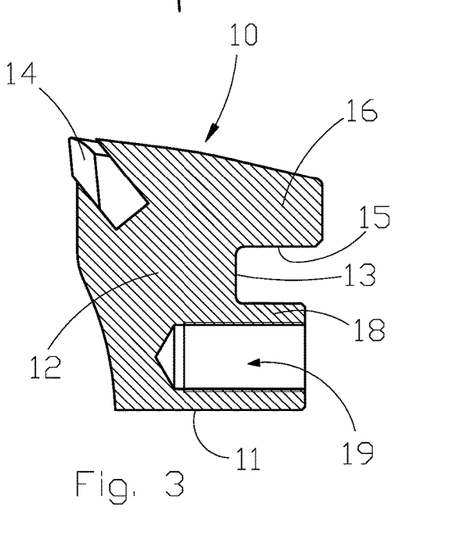
FIG. 3 is a schematic side view of the tool in FIG. 2, seen in section according to a transverse plane.

The first tool 10, illustrated in the FIGS. 2, 3 according to a first embodiment of the invention, comprises a body 12, made of steel, in which a cutting element 14, made of a hard material, is mount to shred objects such as stones, earth blocks, wood, etc. that are subjected to the action of the first tool 10.

A protruding sector 16 and a cylindrical body 18 protrude from the rear part of the body 12, rearward with respect to the part that comes into contact with objects to be shredded. The protruding sector 16 protrudes in the upper part while the cylindrical body 18 protrudes in the lower part, a blind hole 19 being formed in the cylindrical body 18.

Thus, a lower face 11, a rear face 13 and an abutment face 15 are defined on the rear and lower parts of the first tool 10. The cylindrical body 18 protrudes from the rear face 13. The abutment face 15 is arranged under the protruding sector 16.

Figure 4:
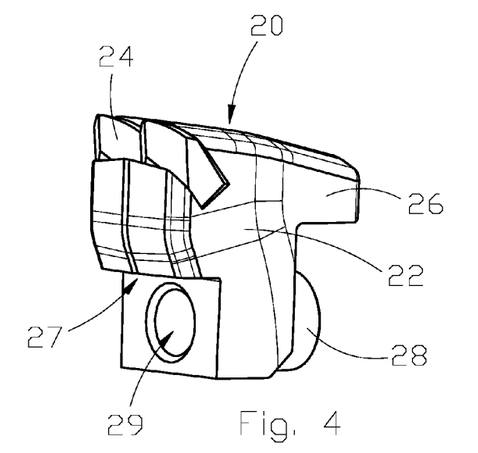
FIG. 4 is a schematic perspective front view of a tool according to a variant of the invention.
Figure 5:
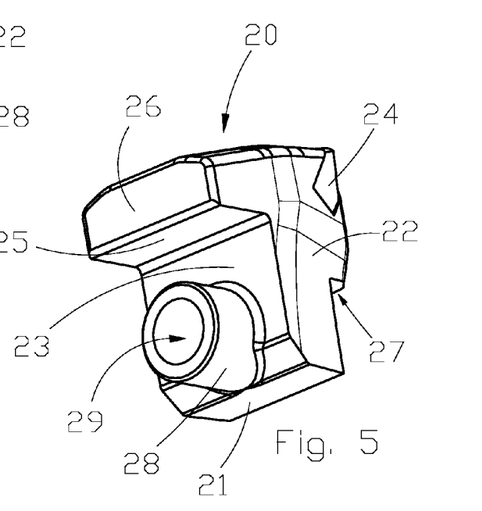
FIG. 5 is a schematic perspective rear view of the tool in FIG. 4.
Figure 6:
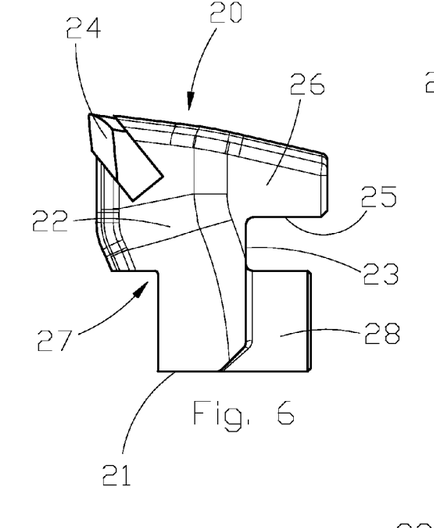
FIG. 6 is a schematic side view of the tool in FIG. 4.
Figure 7:
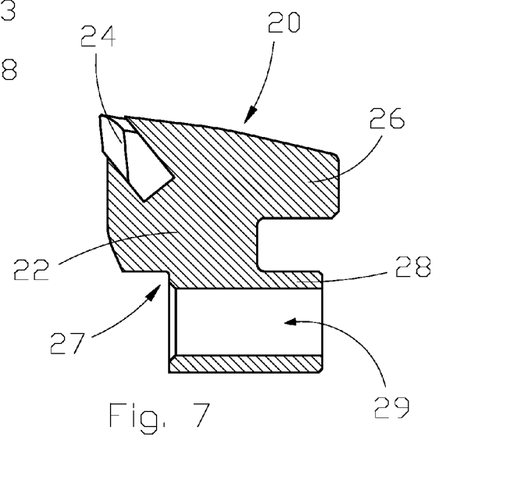
FIG. 7 is a schematic side view of the tool in FIG. 4, seen in section according to a transverse plane.

As from FIGS. 4 and 7 and according to a variant of the invention, the second tool 20 comprises a body 22, made of steel, in which a cutting element 24, made of a hard material, is mounted to shred objects such as stones, earth blocks, wood, etc. being subjected to the action of the second tool 20.

A protruding sector 26 and a cylindrical body 28 protrude from the rear part of the body 22, rearward with respect to the part that comes into contact with the objects to be shredded. The protruding sector 26 protrudes on the upper part while the cylindrical body 28 protrudes in the lower part, a through hole 29 being formed in the cylindrical body 28.

Thus, a lower face 21, a rear face 23 and an abutment face 25 are defined in the rear and lower parts of the second tool 20, the cylindrical body 28 being protruding from the rear face 23 and the abutment face 25 being disposed under the protruding sector 26.

A recess 27 is formed in the front part of the body 22 in correspondence with the through hole 29.

In substance, the second tool 20 has a shape that is substantially equal to that of the first tool 10, except the recess 27 formed in the body 22 of the second tool 20.

Figures 8, 9, 10, 11:
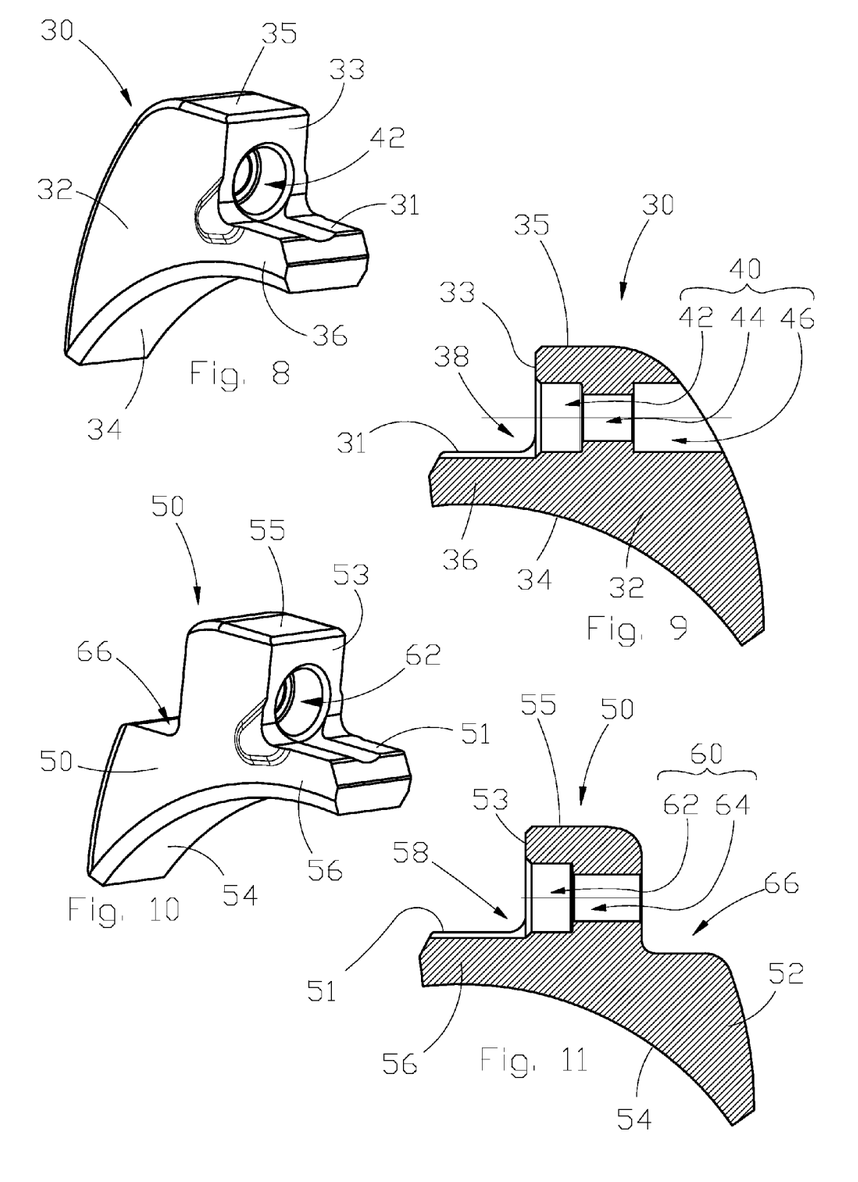
FIG. 8 is a schematic perspective front view of a toolholder according to the invention.
FIG. 9 is a schematic side view of the toolholder in FIG. 8, seen in section according to a transverse plane.
FIG. 10 is a schematic perspective front view of a toolholder according to a variant of the invention.
FIG. 11 is a schematic side view of the toolholder in FIG. 10, seen in section according to a transverse plane.

The first toolholder 30, illustrated individually in FIGS. 8, 9 according to a first embodiment of the invention, comprises a body 32, made of steel, from which a protruding portion 36 protrudes frontally.

The lower surface 34 of the body 32, which surface continues in the protruding portion 36, is shaped like an arc of circle. The first toolholder 30 is fixed to the rotor by means of the same lower surface 34.

The protruding portion 36 forms, with respect to the body 32, a right angle recess 38 at the upper and front part of the body 32 in order to define a lower face 31, a front face 33 and an upper face 35 in the upper part of the body 32.

A through hole 40 is formed on the upper part of the body 32 and consists of a first hole 42, a second hole 44 and a third hole 46, which are continuous and coaxial to each other.

The first hole 42 is opened in the front face 33, the third hole 46 is opened in the rear part of the body 32 and the second hole 44 puts the first hole 42 and the third hole 46 in communication to each other and has a smaller diameter than the first hole 42 and the third hole 46.

The lower face 31 is disposed on a plane tangent to the inner surface of the first hole 42. In substance, the lower segment belonging to the surface of the first hole 42 rests on the same plane as the lower face 31.

The second toolholder 50, illustrated individually in FIGS. 10, 11 according to a second embodiment of the invention, comprises, like the first toolholder 30 previously described, a body 52, made of steel, from which a protruding portion 56 protrudes frontally.

The lower surface 54 of the body 52, which surface continues in the protruding portion 56, is shaped like an arc of circle. The second toolholder is fixed to the rotor by means of the same lower surface 54.

The protruding portion 56 forms on the upper part, with respect to the body 52, a front right angle recess 58 at the upper and front part of the body 52 in order to define a lower face 51, a front face 53 and an upper face 55 on the upper part of the body 52.

A through hole 60 is formed on the upper part of the body 52 and consists of a first hole 62 ad a second hole 64, which are continuous and coaxial to each other.

The first hole 62 is opened in the front face 53 while the second hole 64 is opened in the rear part of the body 52, the second hole 64 having a smaller diameter than the same first hole 62.

Like the first toolholder 30, the lower face 51 is disposed on a plane tangent to the inner surface of the first hole 62. In substance, the lower segment belonging to the surface of the first hole 62 rests on the same plane as the lower face 51.

Moreover, a right angle rear recess 66 is formed in the rear and upper part of the body 52 and is disposed in the opposite part with respect to the front recess 58, the second hole 64 being opened in the rear recess 66.

The assembling of a tool and a toolholder, as those described previously, is described below in order to obtain a tool-toolholder unit, which is also the subject of the invention.

Figures 12, 13:
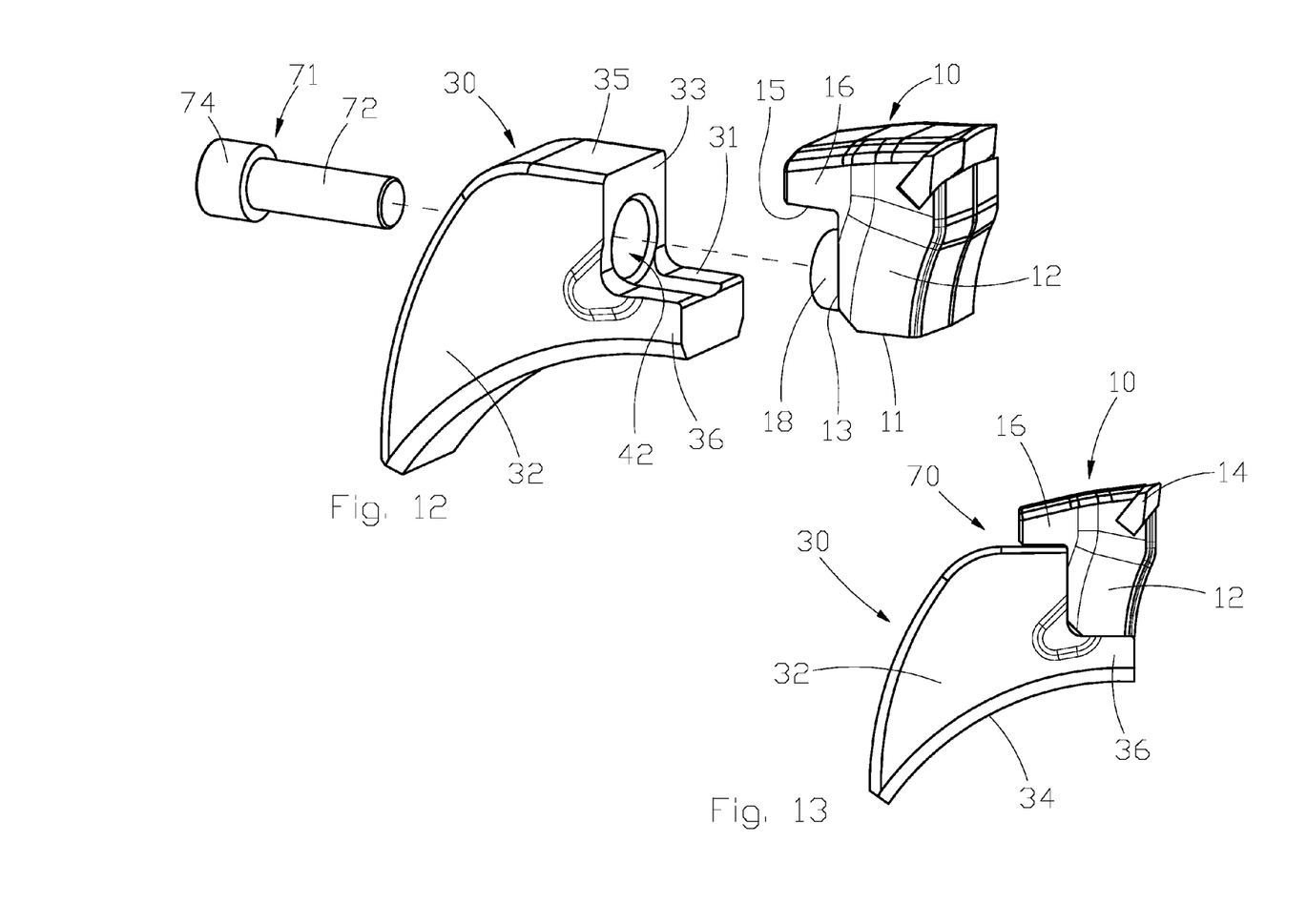
FIGS. 12, 13 are an exploded view and a side view, respectively, of a tool-toolholder unit according to the invention, formed by assembling the tool in FIG. 2, the toolholder in FIG. 8 and a screw.

A first tool-toolholder unit 70, illustrated in the FIGS. 12, 13, according to a first embodiment of the invention, is obtained by connecting the first tool 10 to the first toolholder 30 by means of a screw 71.

The first tool 10 is laid on the toolholder 30 so that the cylindrical body 18 is inserted in the first hole 42 formed in the first toolholder 30 and that the lower face 11, the rear face 13 and the abutment face 15 abut on the lower face 31, the front face 33 and the upper face 35 of the first toolholder 30, respectively.

The screw 71 consisting of a stem 72 and a head 74 is inserted in the through hole 40 of the first toolholder 30 and screwed into the threaded blind hole 19 of the first tool 10.

Thus, the first tool 10 is locked into the toolholder 30.

Figures 14, 15:
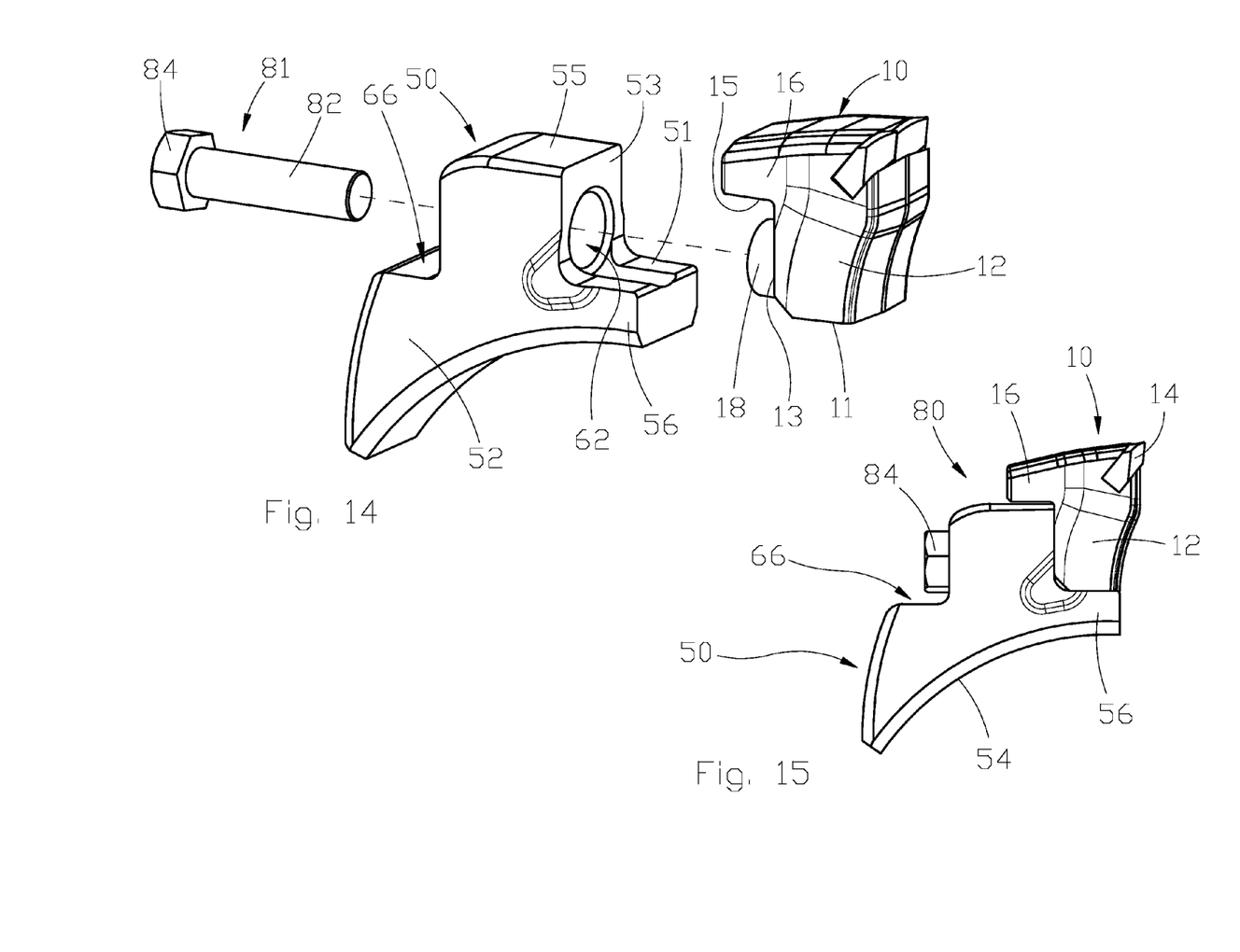
FIGS. 14, 15 are an exploded view and a side view, respectively, of a tool-toolholder unit according to a first variant of the invention, formed by assembling the tool in FIG. 2, the toolholder in FIG. 10 and a screw.

A second tool-toolholder unit 80, illustrated in the FIGS. 14, 15 according to a second embodiment of the invention is obtained by connecting the first tool 10 to the second toolholder 50 by means of a screw 81.

The first tool 10 is laid on the second toolholder 50 so that the cylindrical body 18 is inserted in the first hole 62 formed in the second toolholder 50 and that the lower face 11, the rear face 13 and the abutment face 15 abut on the lower face 51, the front face 53 and the upper face 55 of the second toolholder 50, respectively.

The screw 81 consisting of a stem 82 and a head 84 is inserted in the through hole 60 of the second toolholder 50 and screwed into the threaded blind hole 19 of the first tool 10.

Concerning the second tool-toolholder unit 80, the head 84 of the screw 81 is at sight since it is arranged in abutment on the body 52 of the second toolholder, and is received in the rear recess 66.

Figure 16:
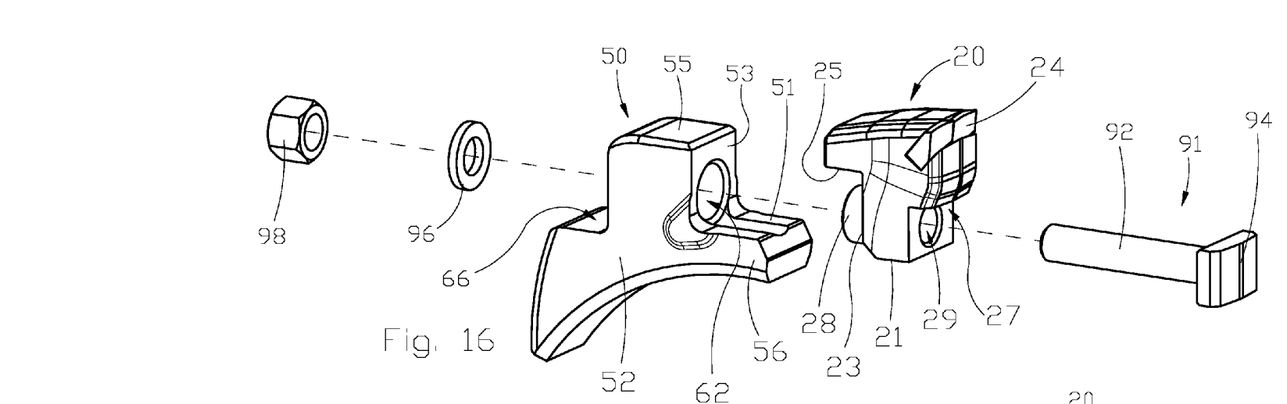
FIGS. 16, 17, 18 are an exploded view, a side view and a perspective side view of a tool-toolholder unit according to a second variant of the invention, formed by assembling the tool in FIG. 4, the toolholder in FIG. 10 and a screw-bushing-washer unit.
Figure 17:
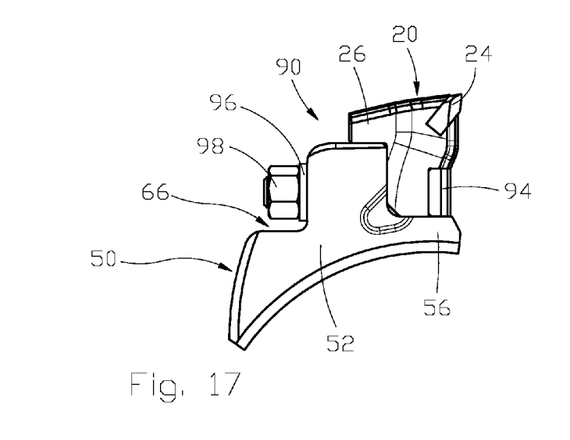
Figure 18:
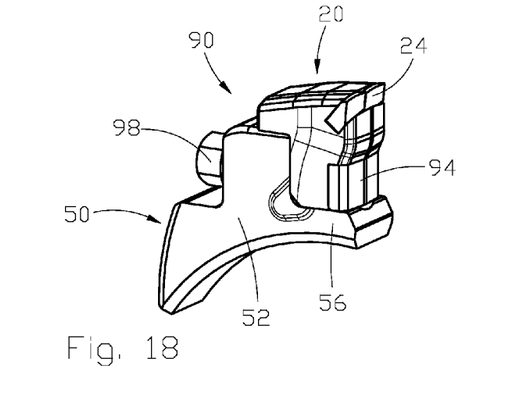

A third tool-toolholder unit 90, illustrated in the FIGS. 16, 17, 18 according to a third embodiment of the invention is obtained by connecting the second tool 20 to the second toolholder 50 by means of a connecting unit comprising the screw 91, the washer 96 and the bolt 98.

The second tool 20 is laid on the second toolholder 50 so that the cylindrical body 28 is inserted in the first hole 62 formed in the second toolholder 50 and that the lower face 21, the rear face 23 and the abutment face 25 abut on the lower face 51, the front face 53 and the upper face 55 of the second toolholder 50, respectively.

The screw 91 consists of a stem 92 and a head 94 having a shape corresponding to the recess 27.

The screw 91 is inserted in the through hole 29 of the second tool 20 and in the through hole 60 of the second toolholder 50 so that the head 94 is in abutment on the body 22 of the second tool 20 and received in the recess 27.

In this way, the whole front and lower portion of the second tool 20 is protected by the head 94 of the screw 91, as illustrated in FIG. 18.

The stem 92 goes out of the through hole 60 in correspondence of the rear recess 66 and the bolt 98 may be screwed into the same stem 92 after placing the washer.

The tool-toolholder units 70, 80, 90, shaped according to the invention in the three embodiments just described, offers several advantages in comparison with the solutions known.

Above all, the support for the tool on the toolholder is on three distinct levels: in fact, the lower face 11, 21, the rear face 13, 23 and the abutment face 15, 25 of the first tool 10 or second tool 20 abut on the lower face 31, 51, the front face 33, 53 and the upper face 35, 55 of the first toolholder 30 or second toolholder 50, respectively.

This triple support effectively counteracts the stresses generated when the tool is in use. In particular, the triple support counteracts the force A and the force B, previously defined and illustrated in FIG. 1 with reference to a tool-toolholder unit according to prior art.

Another advantage is that the engagement of the cylindrical body 18, 28 of the first tool 10 or the second tool 20 in the first hole 42, 62 of the first toolholder 30 or second toolholder 50 effectively counteracts the lateral displacements of the tool relative to the toolholder and the same rotor, namely according to a longitudinal direction of the rotor tube.

Moreover, the triple support of the tool on the toolholder, the engagement of the cylindrical body in the hole of the toolholder, and the fixing by means of the screw prevent the same tool from rotating about the axis of the screw and ensure a good coupling of the tool to the toolholder and an optimum fixing of tool and toolholder.

Another advantage of the invention is the particular position of the cylindrical body placed at the lower end of the tool and, consequently, of the fixing screw with respect to the whole tool-toolholder unit. This position forms the maximum counteraction to the forces produced by the working in the front direction, namely to the force B in FIG. 1 while maintaining a good efficacy in counteracting the radial and rotational stresses.

In other terms, the tightness of the screw creates a moment with respect to the point $C_B$—as disposed in FIG. 1—which counteracts the moment $M_B$. By placing the screw at the lower end, the arm of said force of tightness has the maximum possible length. In this way, it is possible to increase the magnitude of the same moment of contrast so as to guarantee a better tightness of the screw and tool-toolholder coupling.

Besides, if the screw is placed in the lowest possible position with respect to the tool and toolholder, the screw has to be longer than the screws that are usually utilized in the units according to the prior art. This greater length improves the elasticity of the same screw which consequently is less subject to breakages.

Furthermore, if the screw is placed in a lower position, the screw is further away from the area of greatest wear corresponding to the space that is closer to the cutting element of the tool.

Moreover, concerning the first tool-toolholder unit 70, the presence of the third hole 46 allows the head 74 of the screw 71 to be entirely received in the body 32 of the first toolholder 30 so as to protect it, at least partially, from milled products and products to be milled that are also in motion.

Concerning the second tool-toolholder unit 80, the rear recess 66 allows the head 84 of the screw 81 to be at sight so as to be perfectly accessible for the operations of screwing or removal of the first tool 10.

Also the third tool-toolholder unit 90 is easily mountable and removable since the bolt 98 is comfortably reachable for the fact of being received in the rear recess 66.

Besides, the presence of a screw-bolt unit avoids the formation of a thread in the hole of the tool and any possible breakage is limited only to the unit in question so that the tool maintains its integrity for longer.

In other words, for a correct maintenance of the tool-toolholder unit it is sufficient to replace the screw-bolt unit according to definite maintenance plans in order to avoid the loss of the tool during the milling or shredding operations.

Furthermore, concerning the third tool-toolholder unit, the head 94 of the screw 91 protects, at least partially, the front portion of the tool, this portion being the part that is more exposed to wear owing to the action of the debris milled or to be milled.

Besides, the tool-toolholder unit according to the invention provides that the lower face of the toolholder is disposed on a plane tangent to the inner surface of the first hole of the same toolholder. Likewise, also the tool provides that its lower face is disposed on a plane tangent to the outer surface of the cylindrical body of the same tool.

In this way, a greater surface continuity is obtained, in particular a greater surface continuity of the second face of the toolholder, so as to reduce the surface discontinuities that could give rise to breaking cracks.

A technician of the sector can make other changes or variants that are to be considered as included in the scope of protection of the present invention. For instance, according to an embodiment similar to that of the third tool-toolholder unit 90, the screw head may substantially cover the entire front face of the tool so as to better protect the tool against wear.

Furthermore, the screw head may be extended also toward the rotor in order to cover the front face of the toolholder.

Likewise, according to an embodiment similar to that of the first tool-toolholder unit 70 or second tool-toolholder unit 80, a tool may comprise a protruding portion that protrudes downward so as to cover and protect the protruding element, identified previously by the reference numbers 36 and 56, and protect the entire front portion of the toolholder.

The invention claimed is:

1. Tool-toolholder unit adapted to be fixed to a rotor of a mincing/milling machine and comprising a tool and a toolholder,
    said tool comprising a lower face and a rear face from which a cylindrical body protrudes, a coupling hole being formed in said cylindrical body;
    said toolholder comprising a body from which a protruding element protrudes so as to form a front recess with a lower face and a front face, a through hole being formed in said toolholder;
    so that the coupling of the tool with the toolholder is obtained by laying the lower face and the rear face of the tool on the lower face and on the front face of the toolholder, respectively by inserting the cylindrical body in the through hole so as to arrange the coupling hole and the through hole coaxially to each other, and inserting a screw in the through hole of the toolholder and in the coupling hole of the tool;
    wherein the lower face of the toolholder is placed on a plane tangent to the inner surface of the through hole of the toolholder and wherein the lower face of the tool is placed on a plane tangent to the outer surface of the cylindrical body of the tool.

2. Tool-toolholder unit according to claim 1, wherein the tool comprises a main body from which a protruding body with a lower abutting face protrudes on the upper part and said abutting face is supported by an upper face of the toolholder when the tool and the toolholder are assembled.

3. Tool-toolholder unit according to claim 1, wherein the coupling hole formed in the tool is threaded so that by coupling the tool to the toolholder the screw passes through the through hole and is screwed into the coupling hole.

4. Tool-toolholder unit according to claim 3, wherein the through hole is formed by a first hole, a second hole and a third hole, the first hole being open towards the front recess and having a diameter equal to the diameter of the cylindrical body, the second hole being continuous and coaxial to the first hole, the third hole being continuous to the second hole, open towards the opposite part of the front recess and having a diameter longer than the diameter of the second hole, wherein the screw comprises a threaded stem and a head, and wherein the stem passing through the through hole is screwed into the coupling hole and the head is received in the third hole and abuts on a circular crown defined by the variation of diameter between the second hole and the third hole.

5. Tool-toolholder unit according to claim 1, wherein in the part of the body, opposite to the front recess, a rear recess is formed, wherein the through hole is formed by a first hole and a second hole, the first hole being open towards the front recess and having a diameter equal to the diameter of the cylindrical body, the second hole being continuous and coaxial to the first hole and open towards the rear recess, wherein the screw comprises a threaded stem and a head, and wherein the stem passing through the through hole is screwed into the coupling hole of the tool and the head abuts on the face of the rear recess and is arranged in the rear recess.

6. Tool-toolholder unit according to claim 1, wherein a front recess is formed in the tool on the front part, wherein the screw comprises a threaded stem and a head having a corresponding section to the front recess, wherein the coupling hole passing through the main body is formed in the tool, is open on one side in the cylindrical body and is open on the other side towards the front front recess, wherein the stem passes through the coupling hole and the through hole and goes out of the rear recess where a washer is inserted and a bolt (98) is screwed.

7. Tool-toolholder according to claim 6, wherein the head of the screw extends along the whole front portion of the tool when the screw is fixed with the bolt to the tool and the toolholder.

8. Toolholder adapted to be fixed to a rotor of a mincing machine and to which a tool is coupled, wherein a main body is comprised, from which body a protruding element extends so as to form a front recess with a lower face and a front face, a through hole being formed in said toolholder and opened towards the front recess and being formed by a first hole facing the front recess, and a second hole, wherein the lower face of the toolholder is placed on a plane tangent to the inner surface of the through hole of the toolholder.

9. Tool to be coupled to a toolholder, wherein a lower face and a rear face are comprised, from which rear face a cylindrical body protrudes in which a coupling hole is formed, wherein the lower face is disposed on a plane tangent to the outer surface of the cylindrical body of the tool.

* * * * *